Patented Oct. 1, 1929

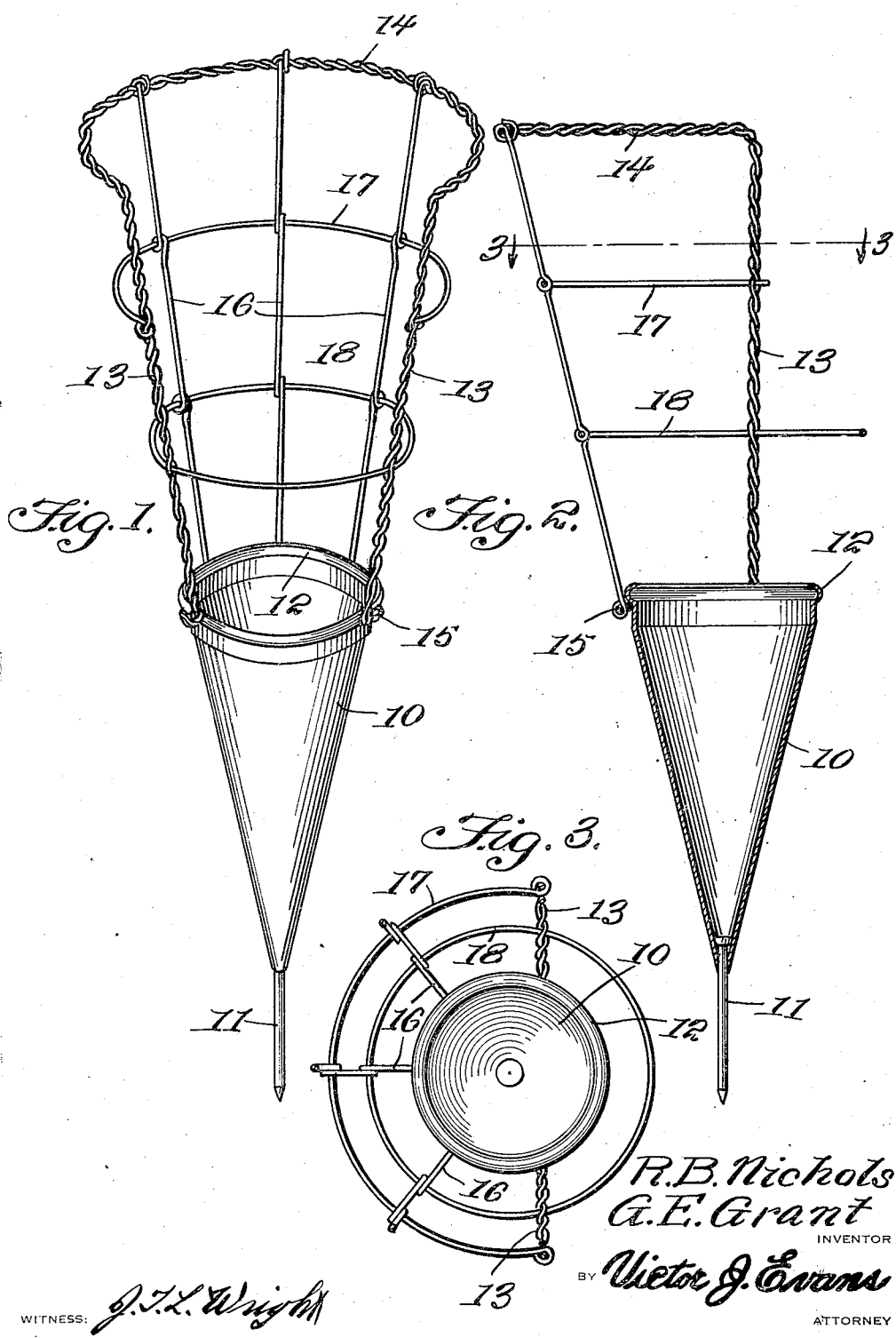

1,730,285

UNITED STATES PATENT OFFICE

ROYAL BARLOW NICHOLS AND GEORGE EDGAR GRANT, OF DERRY, NEW HAMPSHIRE

POT ATTACHMENT

Application filed September 2, 1927. Serial No. 217,218.

This invention contemplates the provision of a flower pot attachment in the nature of a support rising from the top of the flower pot and designed to properly support cut flowers or the like without the necessity of cutting long stems from the flowers.

More specifically stated, the invention contemplates an attachment of the above mentioned character which is constructed from wire, including a split resilient band adapted to be clamped about the mouth of the flower pot, while the support proper is tapered to form a continuity of the shape of the pot itself.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:

Figure 1 is a view in elevation of the flower pot having the invention associated therewith.

Figure 2 is a vertical longitudinal sectional view taken at right angle to Figure 1.

Figure 3 is a sectional view on the line 3—3 of Figure 2.

Referring to the drawing in detail, 10 indicates a flower pot of the ordinary well known construction, tapered towards its lower end and provided with a pointed ground engaging element 11 adapted to be driven into the ground for the purpose of supporting the pot 10 vertically. The upper edge of the pot 10 is formed with an an annular bead 12 beneath which the support is clamped.

The support forming the subject matter of the present invention is as above stated in the nature of an attachment for a pot of the character above described, and is preferably constructed of wire although it may be formed of other suitable material. The main frame of the support includes a pair of divergently disposed limbs 13, the upper ends of which are continued to form the semi-circular top portion arranged at a right angle to the limb and indicated at 14. The limbs are connected at their lower ends by a split semi-circular clamp 15 formed from the same wire from which the support is formed, and which clamp is adapted to embrace the upper edge of the pot 10 immediately beneath the bead 12 as clearly illustrated in Figure 2. The support also includes vertically disposed bracing elements 16 which are terminally coiled about the semi-circular portions 14 and 15, and also coiled about an intermediate semi-circular portion 17 which is also secured to the limbs 13 as shown. The vertical brace elements 16 are also coiled about an annulus or ring 18 supported by the legs 13 at a point in close proximity to the top of the pot 10, the ring 18 preventing the cut flowers from falling forwardly and out of the support. The entire support is therefore tapered longitudinally so that when it is mounted upon the pot 10 it forms a continuation of the configuration of the pot as will be readily understood. The support can be manufactured and sold at a nominal cost, and it is obvious that it can be quickly and conveniently attached to or removed from the pot 10 as the occasion may require.

While it is believed that from the foregoing description, the nature and advantages of the invention will be readily apparent we desire to have it understood that we do not limit ourselves to what is herein shown and described, and that such changes may be resorted to when desired as fall within the scope of what is claimed.

What is claimed is:—

1. A flower pot attachment of the character described comprising a pair of divergently disposed legs, semi-circular portions arranged at the upper and lower ends of said legs and of relatively different dimensions, the lowermost portion constituting a yieldable clamp adapted to embrace the upper edge of the flower pot, and reinforcing elements connecting the legs and the upper and lower semi-circular portions.

2. A flower pot attachment of the character described formed from wire and comprising a pair of divergently disposed legs, semi-circular portions arranged at the upper and lower ends of the legs and at right angles thereto, said lowermost portion constituting a resilient clamp adapted to embrace the upper edge of the flower pot, bracing elements connecting said semi-circular portions, and an annulus carried by the bracing elements and said legs for the purpose specified.

3. A flower pot attachment of the character described, formed from wire and comprising a pair of divergently disposed legs, semi-circular portions arranged at the upper and lower ends of the legs and at right angles thereto, said portions being of relatively different dimensions with the smallest constituting a split clamp designed to embrace the upper edge of the flower pot, vertically disposed bracing elements connecting said portions, a semi-circular bracing element connected with the legs and said vertical bracing elements, and an annulus carried by the vertical bracing elements and the legs and arranged directly above the flower pot for the purpose specified.

4. A flower pot attachment of the character described formed from wire and comprising a pair of divergently disposed legs extended at their upper and lower ends to provide semi-circular portions wholly projecting beyond one side of the legs and at right angles thereto, a plurality of vertically disposed bracing elements terminally coiled about the said semi-circular portions, an intermediate semi-circular brace terminally connected to the divergent legs and also connected with said vertical supports, and an annulus supported by the legs and said vertical supports and projecting partly in advance of said legs.

In testimony whereof we affix our signatures.

ROYAL BARLOW NICHOLS.
GEORGE EDGAR GRANT.